United States Patent [19]

Myers et al.

[11] Patent Number: 5,725,431
[45] Date of Patent: Mar. 10, 1998

[54] THRUST WASHER FOR UNIVERSAL JOINT HAVING PRELOADING THRUST SURFACES

[75] Inventors: Gerald L. Myers, Maumee; James T. Reynolds, Toledo, both of Ohio

[73] Assignee: Dana Corporation, Toledo, Ohio

[21] Appl. No.: 717,230

[22] Filed: Sep. 26, 1996

[51] Int. Cl.⁶ .............. F16C 33/10; F16C 3/41; F16D 3/205
[52] U.S. Cl. .............. 464/128; 384/127; 384/371; 384/420; 464/132
[58] Field of Search .............. 464/128, 132, 464/136; 384/127, 368, 371, 420, 425

[56] References Cited

U.S. PATENT DOCUMENTS

| | | | |
|---|---|---|---|
| 1,621,215 | 3/1927 | Peters . | |
| 3,015,526 | 1/1962 | Dubois | 384/420 |
| 3,050,351 | 8/1962 | Kempf | 384/425 X |
| 3,070,980 | 1/1963 | Slaght . | |
| 3,120,982 | 2/1964 | Leblanc | 384/420 |
| 3,178,907 | 4/1965 | Lyons . | |
| 3,721,110 | 3/1973 | Borneman . | |
| 3,788,712 | 1/1974 | Kohler et al. | 464/128 X |
| 3,950,834 | 4/1976 | Pitner | 464/128 X |
| 4,050,130 | 9/1977 | Pitner | 464/128 X |
| 4,130,325 | 12/1978 | Schultenkamper . | |
| 4,325,593 | 4/1982 | Mallet . | |
| 4,445,875 | 5/1984 | Kosuda et al. | 464/128 X |
| 4,637,740 | 1/1987 | Olschewski et al. | 384/425 |
| 4,772,188 | 9/1988 | Kimura et al. | 384/368 X |
| 4,795,220 | 1/1989 | Mori | 384/368 X |
| 4,857,787 | 8/1989 | Bauer et al. | 464/128 X |
| 4,934,979 | 6/1990 | Gille et al. | 464/132 X |
| 5,106,342 | 4/1992 | Fiser | 464/132 |
| 5,554,015 | 9/1996 | Dreiman et al. | 384/368 X |

FOREIGN PATENT DOCUMENTS

| | | | |
|---|---|---|---|
| 3115659 | 11/1982 | Germany | 464/128 |
| 1587241 | 8/1990 | U.S.S.R. | 384/368 |

*Primary Examiner*—Eileen A. Dunn
*Attorney, Agent, or Firm*—MacMillan, Sobanski & Todd

[57] ABSTRACT

A thrust washer for use in a universal joint having a preloading thrust surface includes a center aperture, an outer surface and an inner surface. A portion of the inner surface defines a thrust surface which contacts the outer end of the trunnion in only a limited contact area. The thrust surface may be located adjacent the outer circumference of the center aperture in the thrust washer. The thrust surface contacts only that portion of the outer end of the trunnion which is adjacent the outer circumference of the lubricant passageway extending through each trunnion. In one embodiment, the inner surface is tapered outwardly such that the thrust surface is defined by the thickest portion of the tapered surface. In another embodiment, the inner surface includes a plurality of protuberances located around the circumference of the center aperture such that these protuberances define the thrust surface. In both embodiments, a small preloading force is applied at the limited contact area on the trunnion which helps to reduce and/or eliminate any radial movement or play between the universal joint components. However, because the contact area is limited, the mount of preloading force is minimized such that the flex effort or torque required to cause the cross member to rotate within its bearing cups is not excessive. In both embodiments, the thrust washer is made from a resilient, deformable material which may be subject to wear such that the thrust surface may wear away after a short period of operation.

20 Claims, 6 Drawing Sheets

THRUST WASHER FOR UNIVERSAL JOINT HAVING PRELOADING THRUST SURFACES

CROSS REFERENCE TO RELATED APPLICATION

Not applicable.

STATEMENT REGARDING FEDERALLY SPONSORED RESEARCH OR DEVELOPMENT

Not applicable.

BACKGROUND OF THE INVENTION

This invention relates in general to thrust washers for use in universal joints. More specifically, this invention relates to an improved structure for a thrust washer for use in a bearing cup mounted on a trunnion of a universal joint cross member having one or more preloading thrust surfaces.

Universal joints are structures which are well known in the art for connecting a driving shaft to a driven shaft for concurrent rotation. Universal joints are typically used in vehicle drive train applications because the driving shaft connected to the engine is often positioned at an angle relative to the driven shaft connected to the wheels. The universal joint allows the rotational motion of the driving shaft to be transferred to the driven shaft when these two shafts are oriented at an angle relative to each other. The universal joint also allows the angle between the driving shaft and the driven shaft to change. Typically, this change in relative angle occurs when a vehicle goes over a bump or a hole in the road, causing the front or rear axle of the vehicle to move up or down in relation to the other axle of the vehicle.

In general, a universal joint includes a cross-shaped member having a central body portion with four trunnions extending outwardly therefrom. The four trunnions of the cross member extend at right angles relative to one another and lie in a single plane. A hollow cylindrical bearing cup having a closed end is disposed over the end of each trunnion. Roller bearings are provided between each bearing cup and its associated trunnion such that the bearing cups are rotatably mounted on the trunnions. Accordingly, the cross member is free to rotate within the bearing cups around a first axis defined by one pair of opposing trunnions (two trunnions which are located 180° apart from each other) and around a second axis defined by the remaining pair of opposing trunnions. Two yokes, each having parallel and spaced apart arms, are secured to the cross-shaped member to complete the universal joint. Each yoke has a pair of parallel, spaced apart arms, and each arm has an aperture for receiving a bearing cup and its associated trunnion. One opposed pair of opposing bearing cups and trunnions is engaged and supported in one yoke, while the other opposed pair of bearing cups and trunnions is engaged and supported in the other yoke.

When the cross member is connected the two yokes, the cross member is free to partially rotate or pivot within the bearing cups around the two axes defined by the two pairs of opposing trunnions. Accordingly, one yoke can be positioned at a predetermined angle relative to the other yoke. In this configuration, the cross member pivots about the two axes to maintain the position of the yokes at the predetermined relative angle. The universal joint as assembled may then be used to operatively connect a driven shaft to a driving shaft by securing one of the yokes to the driving shaft and the other yoke to the driven shaft. Thus, the universal joint allows the rotation of the driving shaft to be transmitted to the driven shaft, even with these two shafts are oriented at an angle relative to each other.

When the universal joint is connected to the driving and driven shafts, it is desirable to minimize or eliminate any radial movement or "play" between the two pairs of opposing trunnions of the cross member, the bearing cups, and the two yokes. Radial movement of the cross member within the bearing cups and the two yokes is generally undesirable because of the wear it may cause on the various components. Radial movement is especially undesirable during the balancing process of the entire driveshaft assembly (including the driving shaft, the universal joint, and the driven shaft) before it is installed into the vehicle. More specifically, the driveshafts can not be balanced properly if the cross member is free to move radially within the two yokes. An operator of a balancing machine will often not get an acceptable confirmation of a balanced condition after adding the requested weight because the cross member has shifted to a new location within the freedom of the bearing cups and yokes. Ideally, it is desirable to design a universal joint such that there is minimal clearance between the ends of the trunnions, the bearing cups, and the yokes when these components are initially assembled to form the universal joint. This condition is often referred to as "preloading" the universal joint, which results in there being little or no radial movement or play between these components.

However, because of manufacturing tolerances present in each of the various components of the universal joint, i.e. the cross member, bearing cups, yokes, and fastening devices, it is very difficult to preload the universal joint so as to eliminate all radial movement or play. More specifically, each of these components will have some manufacturing dimensional tolerances associated with it such that its thickness, diameter, or length can be made within a range defined by a minimum value and a maximum value. Accordingly, some radial movement or play may be present.

Because there may be some radial movement in a universal joint and because both the cross member and the bearing cups are typically manufactured from a metal or metal alloy, a thrust washer is often used to absorb the radially directed, thrust forces which may occur between these two components. More specifically, the thrust washer is placed between the end of each trunnion and the inner surface of the closed end of each bearing cup. The thrust washer may be made from a wear-resistant material such as plastic which can absorb the thrust loads applied inward or outward in the radial direction.

While thrust washers are effective in absorbing thrust loads, they may contribute to the overall amount of play between the components. More specifically, because thrust washers are also manufactured according to specific tolerances, the addition of these components in the universal joint may actually increase the mount of radial movement. One way to eliminate this problem is to make the thrust washer from a deformable material. Thrust washers made from a deformable material can be compressed during assembly to help eliminate any play between the trunnions and bearing cups. However, deformable thrust washers also have drawbacks. One drawback associated with deformable thrust washers is that the amount of preload force they apply may be too high, thereby causing the flex effort or flex torque of the universal joint to be too high. "Flex effort" or "flex torque" is defined as the amount of force required to cause a pair of opposing trunnions to pivot or partially rotate around its axis. Flex effort or flex torque can also be defined as a resistance of the cross member to pivot about the two axes defined by the two pairs of opposing trunnions. If the opposing trunnions fit lightly against their associated bearing cups such that there is a physical interference between these components, it will take more force or effort to allow this pair of opposing trunnions to partially rotate or pivot around its axis. It is desirable that the amount of such flex efforts or flex torques be maintained at a minimum value to prevent vibration and other undesirable consequences. Thus, it would be desirable to provide a thrust washer in a universal joint which minimizes the amount of flex effort or torque for a given amount of preload force across the bearing.

SUMMARY OF THE INVENTION

This invention relates to a thrust washer having preloading thrust surfaces for use in a bearing cup mounted on a trunnion of a universal joint cross member. More specifically, the thrust washer is an annular shaped disk having a central aperture. The thrust washer is disposed between the inner surface of the bearing cup and the outer end of the trunnion. The outer end of the trunnion has a central lubricant passageway extending therethrough, and the aperture of the thrust washer is generally aligned with this passageway. The surface of the thrust washer located adjacent to the outer end of the trunnion is defined as the inner surface. This inner surface has a predetermined width and includes a thrust surface on only a portion of that width. The thrust surface may be generally annular in shape and may be located adjacent the outer circumference of the center aperture. As a result, the contact area on the trunnion may be annular in shape and located adjacent the center passageway extending through the trunnion.

In general, the thrust surface on the thrust washer may be configured to provide a small preloading force at the limited contact area of the trunnion while minimizing the flex torque or effort required to allow the trunnion to rotate within its bearing cup. Ideally, the thrust washer is made from a deformable but wearable material. As such, after an initial break-in period, the thrust surface may wear away reducing the mount of preloading force being applied. Therefore, after the initial break-in period, most of the inner surface of the thrust washer may be in contact with the open end of the trunnion.

In a first embodiment of the invention, the inner surface of the thrust washer is tapered outwardly from its center aperture towards its outer circumferential edge. The thickness of the thrust washer adjacent the center aperture is greater than the thickness of the washer adjacent its outer edge. In this first embodiment, the thicker portion of the washer adjacent the center aperture defines the thrust surface. The thrust surface applies a small preloading force on the trunnion in an annular-shaped, limited contact area which is adjacent the lubricant passageway extending through each trunnion.

In a second embodiment of the invention, the inner surface includes a plurality of protuberances which defines the thrust surface. These protuberances are positioned adjacent the center aperture of the washer. Similarly to the first embodiment, the thrust surface contacts the open end of the trunnion in a limited contact area near the lubricant passageway. In a preferred embodiment, four protuberances are positioned equidistantly around the center aperture in a generally annular-shaped zone.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
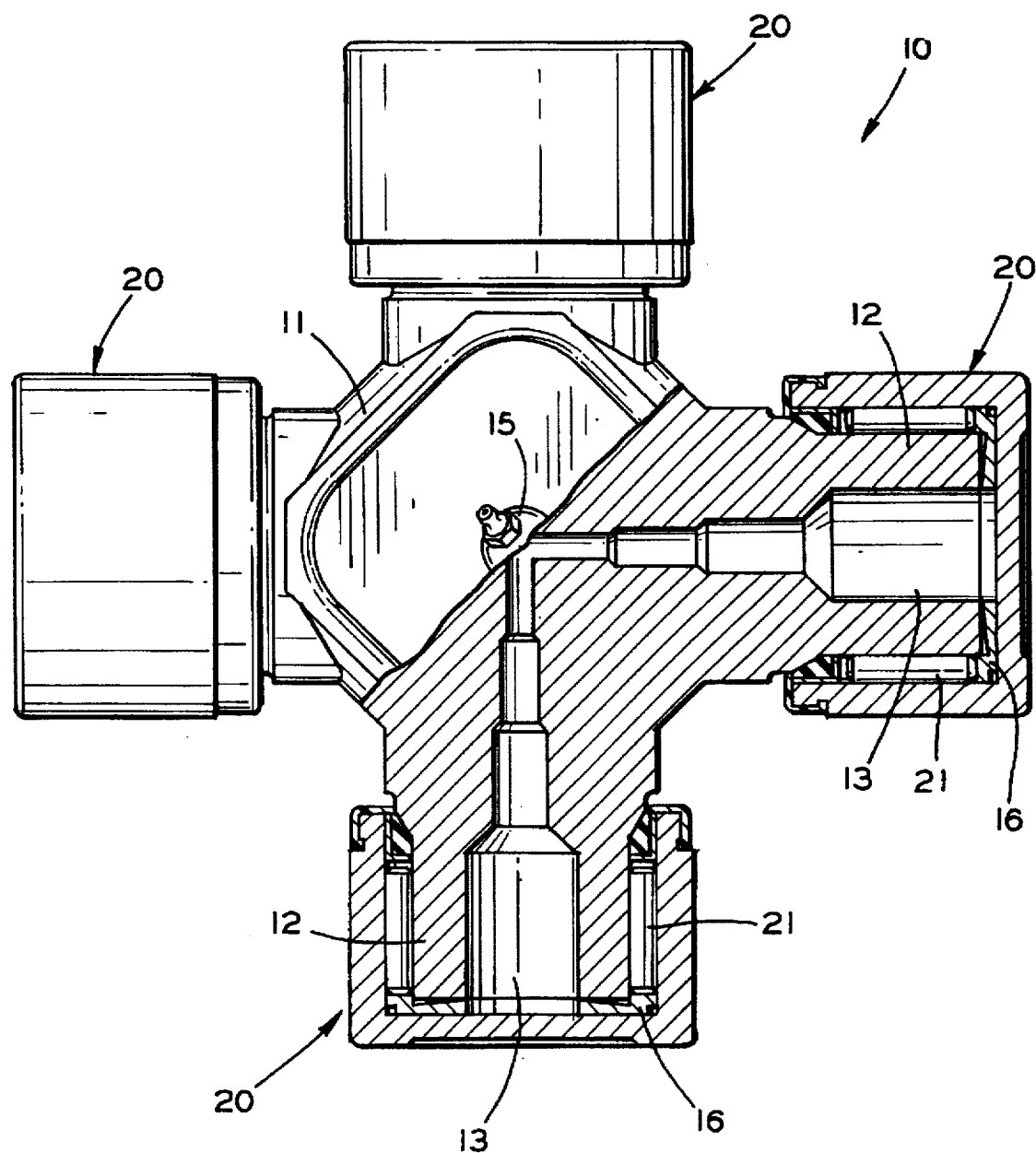
FIG. 1 is an elevational view, partially in cross section, of a portion of a universal joint including a first embodiment of a thrust washer in accordance with this invention.

Referring now to the drawings, there is illustrated in FIG. 1 a cross member, indicated generally at 10. The cross member 10 includes a central body portion 11 and a plurality of trunnions 12. The cross member 10 is adapted to form a portion of a conventional universal joint. Also frowning a portion of the universal joint are bearing cups, indicated generally at 20, which are disposed around the end of each trunnion 12. A thrust washer, indicated generally at 16, is disposed between each trunnion 12 and bearing cup 20. The remainder of the universal joint is comprised of two yokes (not shown), one which may be secured to a driving shaft and the other which may be secured to a driven shaft when the universal joint is used in a vehicle drive train application. Opposing trunnions 12 (i.e. trunnions located 180° apart from each other) are secured within apertures located in opposing arms of each yoke by any suitable fastening device (not shown). Suitable fastening devices include, but are not limited to, snap rings, injected molded plastic tings, U-bolts, or bolted plates which fit against each bearing cup 20 and its associated yoke to fix each pair of opposing trunnions 12 in place within its associated yoke arms.

Referring again to FIG. 1, four trunnions 12 are formed integrally with the body portion 11. The trunnions 12 are disposed at tight angles relative to one another and are oriented so as to lie in a single plane. Each trunnion 12 of the cross member 10 is generally cylindrical in shape and includes an internal passageway 13. All of the internal passageways 13 extend outwardly from a central cavity (not shown) in the central body 11 of the cross member 10 and terminate at the outer end of its respective trunnion, hereinafter referred to as the open end 12e of the trunnion. As shown in this embodiment, a fitting 15 is received in an aperture (not shown) which communicates with the central cavity (not shown) of the central body 11. The fitting 15 is used for supplying a lubricant to the passageways 13 of the trunnions 12. The lubricant is used to lubricate roller bearings 21 which are disposed between the trunnions 12 and the bearing cups 20. Although the lubricant fitting 15 in the illustrated embodiment communicates with a central cavity (not shown) of the central body 11, the lubricant fitting 15 could alternatively be located anywhere in the central body, provided this alternate position allows lubricant to be supplied to all four passageways 13.

Figure 2:
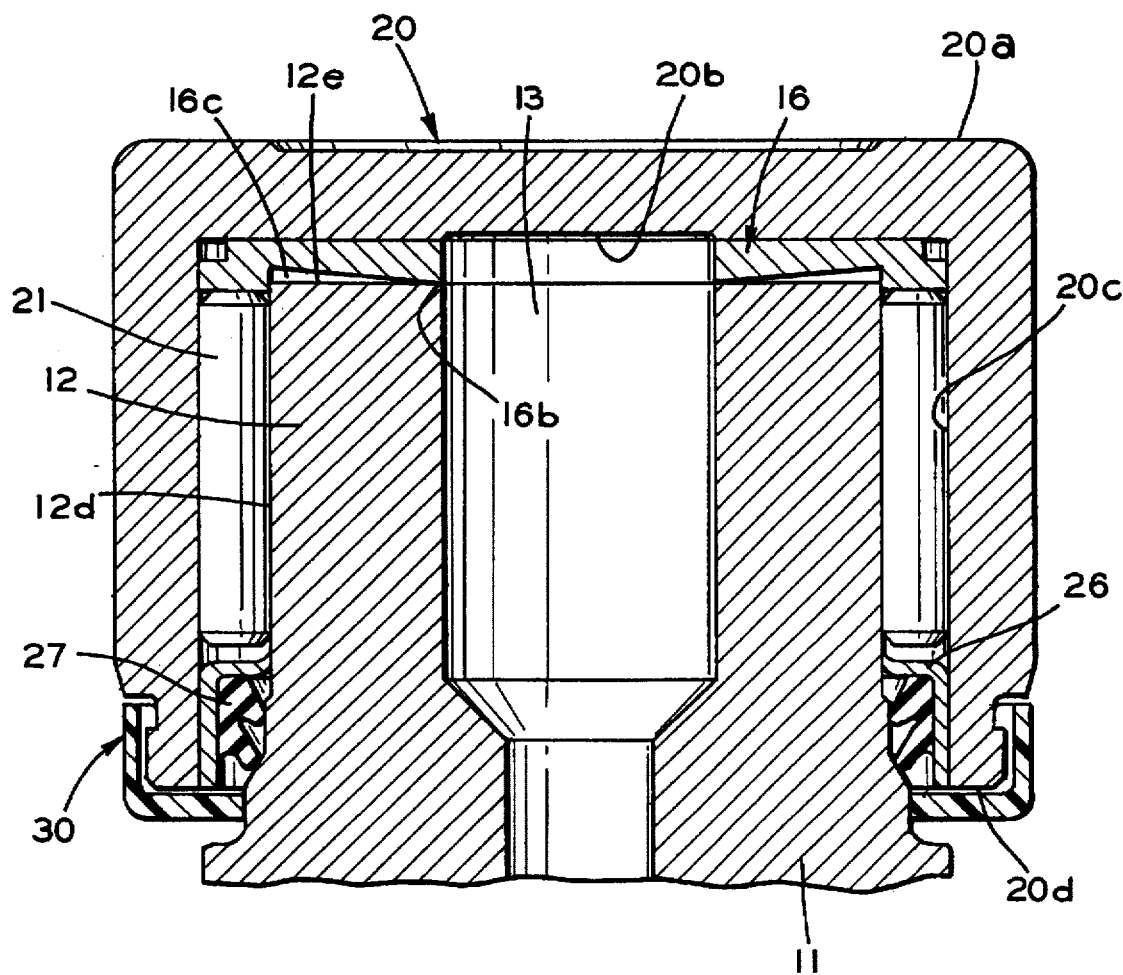
FIG. 2 is an enlarged sectional elevational view of a portion of the universal joint illustrated in FIG. 1.

As shown in FIGS. 1 and 2, a bearing cup 20 is mounted about the cylindrical outer surface 12d and the open end 12e of each trunnion 12. Each bearing cup 20 is generally hollow and cylindrical in shape, having an open end 20d, a closed end 20a, an inner surface 20b of the closed end 20a, and a generally annular-shaped inner surface 20c. The diameter of the annular inner surface 20c of each bearing cup 20 is larger than the diameter of the outer surface 12d of each trunnion 12. As a result, a plurality of conventional roller bearings 21 may be disposed between each bearing cup inner surface 20c and each trunnion outer surface 12d so as to allow each bearing cup 20 to rotate about its respective trunnion 12. The roller bearings 21 are oriented to rotate on an axis parallel to an axis defined by the cylindrical trunnions 12 and are arranged in a circumferential array about this axis. The roller bearings 21 may be protected from dirt and other contaminants by any suitable seal 27 which may be secured between each bearing cup 20 and trunnion 12 by a support ring 26. Additionally, the roller bearings 21 may be further protected by using any suitable dust guard 30.

Because of manufacturing tolerances associated with the dimensions of the bearing cups 20, the trunnions 12, yokes and fastening devices, a certain amount of radial movement or play may be present between these components when they are assembled to form the universal joint. In order to absorb any radially directed thrust loads which may occur due to this play, it may be desirable to use a thrust washer such as the washer indicated generally at 16. The thrust washer 16 is disposed between the inner surface 20b of the closed end 20a of each bearing cup 20 and the open end 12e of each trunnion 12. In accordance with this invention, the thrust washer 16 is made from a deformable, wearable material which provides a small, temporary preloading force while still minimizing the flex effort required to cause the cross member 10 to pivot about its two axes. The thrust washer 16 provides this temporary preloading force during an initial balancing process of the drive train. This initial preloading force may be reduced or eliminated as the thrust washer 16 deforms or is worn away after a very short break-in period.

A first embodiment of a thrust washer 16 in accordance with this invention is shown in FIGS. 1 through 6. In general, the thrust washer 16 is an annular-shaped, relatively thin disk having a center aperture 16d. The center aperture 16d may correspond in size to the diameter of the lubricant passageway 13 found in each trunnion 12. As used herein, the surface of the thrust washer 16 which faces and contacts the open end 12e of each trunnion 12 is defined as the inner surface 16a. Accordingly, the side of the thrust washer 16 which faces and contacts the inner surface 20b of the bearing cup 20 is defined as the outer surface 16h. The thrust washer 16 may have a flange or lip 16f formed on its inner surface 16a and located at its outer circumferential edge.

In the illustrated embodiment, the inner surface 16a is tapered outwardly from its center aperture 16d towards its outer circumferential edge thereby forming an annular-shaped thrust surface 16b. The thrust surface 16b is concentric with and adjacent the outer circumference of the center aperture 16d. As a result, the thrust surface 16b contacts the trunnion outer end 12e in only a limited contact area. The limited contact area on the trunnion outer end 12e is also an annular-shaped portion which is adjacent the center passageway 13 of each trunnion 12.

Figure 3:
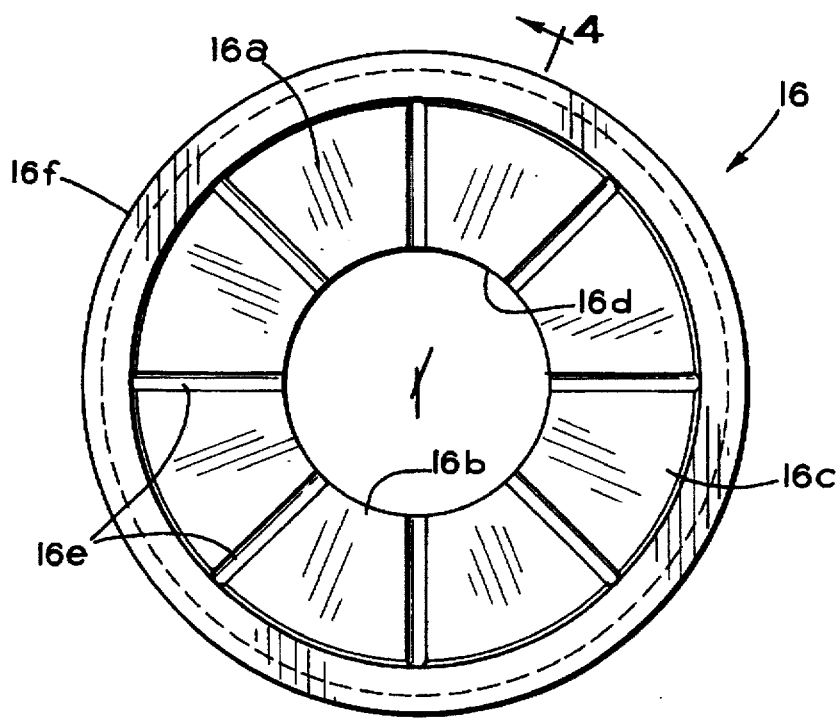
FIG. 3 is an enlarged plan view of the thrust washer illustrated in FIGS. 1 and 2.
Figure 4:
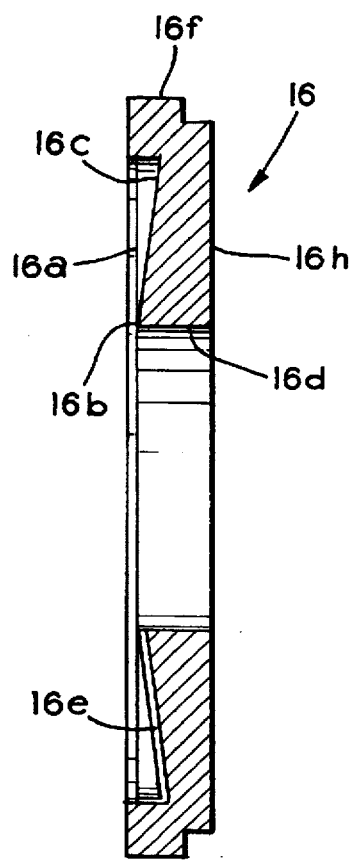
FIG. 4 is a sectional elevational view of the thrust washer taken along line 4—4 of FIG. 3.
Figure 5:
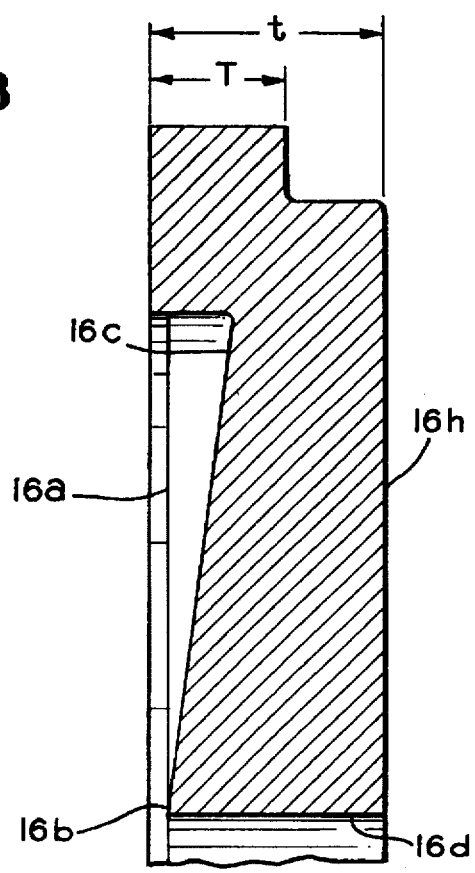
FIG. 5 is an enlarged sectional elevational view of a portion of the thrust washer illustrated in FIG. 4.

As used herein, the terms "taper" or "tapered" indicates that the thickness of the thrust washer 16 is greater at the thrust surface 16b than at a non-contact area 16c shown in FIGS. 3, 4, and 5. Thus, the taper of the inner surface 16a extends outwardly from the center aperture 16d towards the outer circumference edge of the thrust washer 16. In alternative terms, the thicker portion of the thrust washer 16 adjacent the center aperture 16d is the thrust surface 16b. The thrust washer 16 can also be defined as being frustoconical in shape with the highest part of the frustoconical shape (excluding the flange portion 16f) occurring near the center aperture 16d. In these terms, the highest part of the frustoconical shape is the thrust surface 16b.

The thrust washer 16 is disposed within the closed end 20a of the bearing cup 20 such that the flange 16f is in contact with the roller bearings 21 while the thrust surface 16b is in contact with the open end 12e of each trunnion 12. Because the thrust washer 16 is disposed between the outer end 12e of the trunnion 12 and the inner surface 20b of the bearing cup 20, grooves 16e may be formed in the thrust washer 16 so as to provide a flowpath for the lubricant to reach the roller bearings 21. Typically, the grooves 16e are formed in the inner surface 16a of the thrust washer 16 as shown in FIG. 3. Alternatively, the grooves 16e may be formed on the outer surface 16h of the thrust washer 16 or on both surfaces.

In the illustrated embodiment, a linear tapered inner surface 16a is shown. However, any type of curvilinear surface could be used. In addition, although this embodiment shows only that the inner surface 16a has a thrust surface 16b, it is also envisioned that the outer surface 16h could be tapered to include a thrust surface 16b or that both sides of the thrust washer could include thrust surfaces 16b. Furthermore, the taper of the inner surface 16a could alternatively extend inward from its outer circumferential edge toward its center aperture 16d. In this alternative embodiment, the limited contact area on the trunnion outer end 12e would be adjacent the outer edge 12d of the trunnion 12.

It should be noted that the taper shown in the figures particularly FIGS. 1, 2, 4 and 5, is exaggerated for illustration pro-poses. In general, the amount of taper is dependent on providing a sufficient preloading force which reduces and/or eliminates radial play between the trunnions 12, bearing cups 20 and the yokes while minimizing the flex effort required to allow the cross member 10 to pivot about its axes. Therefore, the mount of taper may depend on the total manufacturing tolerances (often referred to as the "stackup" of manufacturing tolerances) between the trunnions 12, thrust washers 16, bearing cups 20, yokes and fastening devices. Additionally, the amount of taper may depend on the total thickness of the thrust washer 16. Usually, thrust washers 16 are designed to be as thin as possible while still being able to absorb thrust loads. However, depending on the overall size of the universal joint, thrust washers may vary in thickness.

As an example, for a washer having an overall thickness of about 1.5±0.06 millimeters, as denoted by "t" in FIG. 5, the amount of taper, denoted by "T" in FIG. 5, may be about 0.075 to about 0.125 mm (i.e. the thickness of the washer 16 at the thrust surface 16b may be about 0.075 to about 0.125 mm thicker than the thickness of the washer 16 at the non-contact area 16c.) Preferably for this example, the amount of taper is about 0.1+0.02 min. Alternatively, the amount of taper, T, may be measured as a percentage of the overall thickness, t, of the washer. In these terms, the amount of taper, T, may range from about 1% to about 10% of the overall thickness, t, of the washer 16.

When the thrust washer 16 is assembled between the trunnions 12 and the bearing cups 20 and positioned in two yokes to form the universal joint, the thrust surface 16b provides a small preloading force at the limited contact area on the trunnion 12 adjacent the passageway 13. The thrust surface 16b is slightly deformed when installed in this manner. This slight amount of preloading is desirable to reduce and/or eliminate any radial play which may exist in the universal joint when it is initially balanced. However, the amount of preloading should be limited so as to minimize the flex effort required to allow the cross member 10 to pivot about its axes within the bearing cups 20. Therefore, the exact size of the annular shaped thrust surface 16b is left to one skilled in the art since the size will be dependent on balancing these two forces for each particular thrust washer 16 design (i.e. the diameter, thickness, and material chosen for each thrust washer 16.)

In order to provide a certain amount of preloading force, the thrust washer 16 may be made from a resilient, deformable, elastic material such as plastic or rubber. In addition, it is preferred that the material be capable of being molded for ease of manufacturing. Suitable materials include, but are not limited to plastics such as nylon or phenolics. Preferably, a nylon-based material such as stanyl TW241F 10 or nylatron CS51-13, or a glass filled nylon composite is used.

Figure 6:
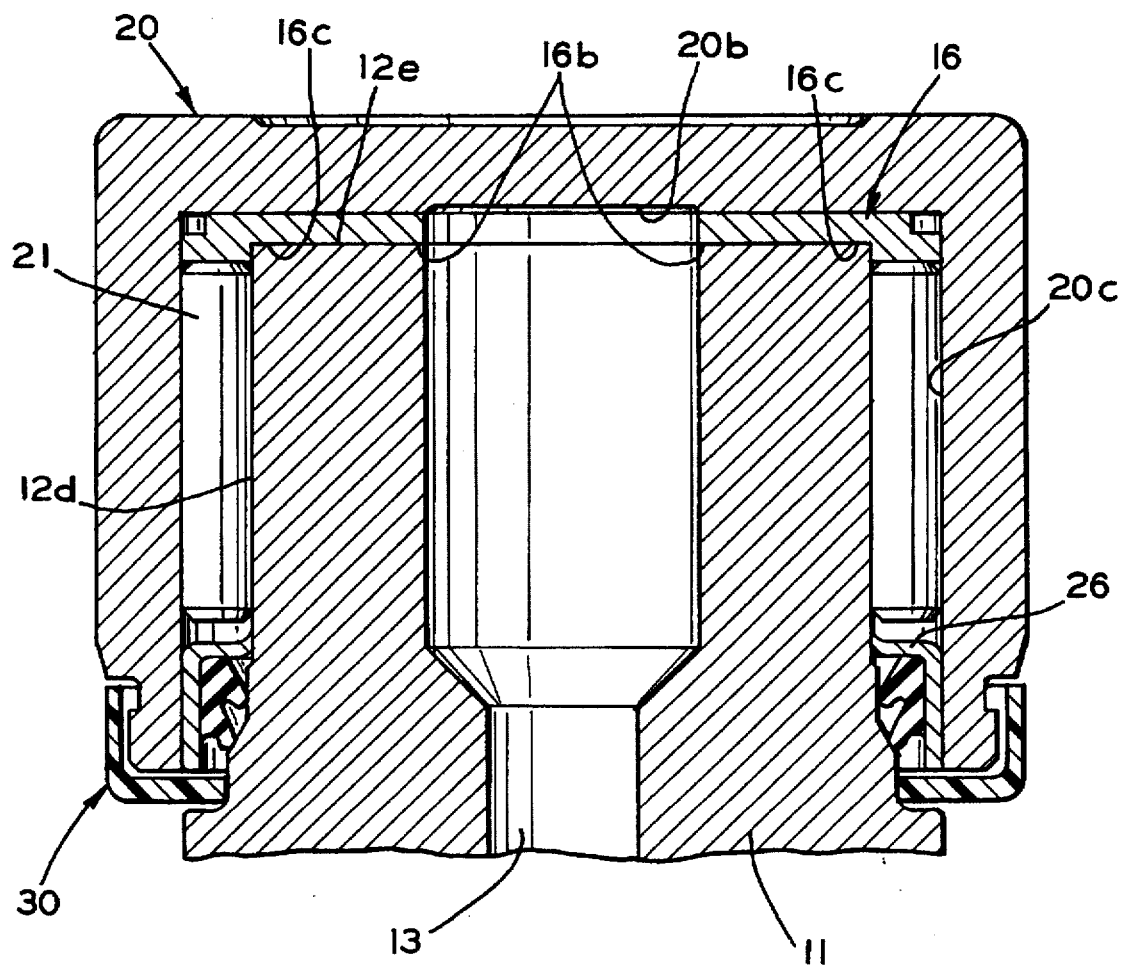
FIG. 6 is a sectional elevational view similar to FIG. 2 which illustrates the various components after wear has occurred because of use.

It may also be desirable that the material chosen for making the thrust washers 16 be subject to wear. As used herein, a material is defined as being "subject to wear" if the thrust surface 16b wears away over time as the universal joint is operated due to the physical removal of material at the thrust surface 16b. Thus, after a period of time, the thrust washer 16 may be seated against the open end 12e of the trunnions at both the thrust sin-face 16b and the non-contact area 16c as shown in FIG. 6. The period of time dining which it is important to have the small preloading force applied is during the initial balancing process of the driveshafts. The use of a deformable thrust surface 16b provides this small preloading force. Because the thrust washer 16 is deformable, it is expected that any high flex effort which may occur will be reduced in a few cycles of operation, thereby providing the desired small amount of preloading force. Once the balancing process is completed, a small amount of play will not adversely affect the normal operation of the drivetrain. Therefore, since the thrust surface 16b may no longer be needed after the balancing process, it may be desirable to allow the thrust surface 16b to wear away over time.

Figure 7:
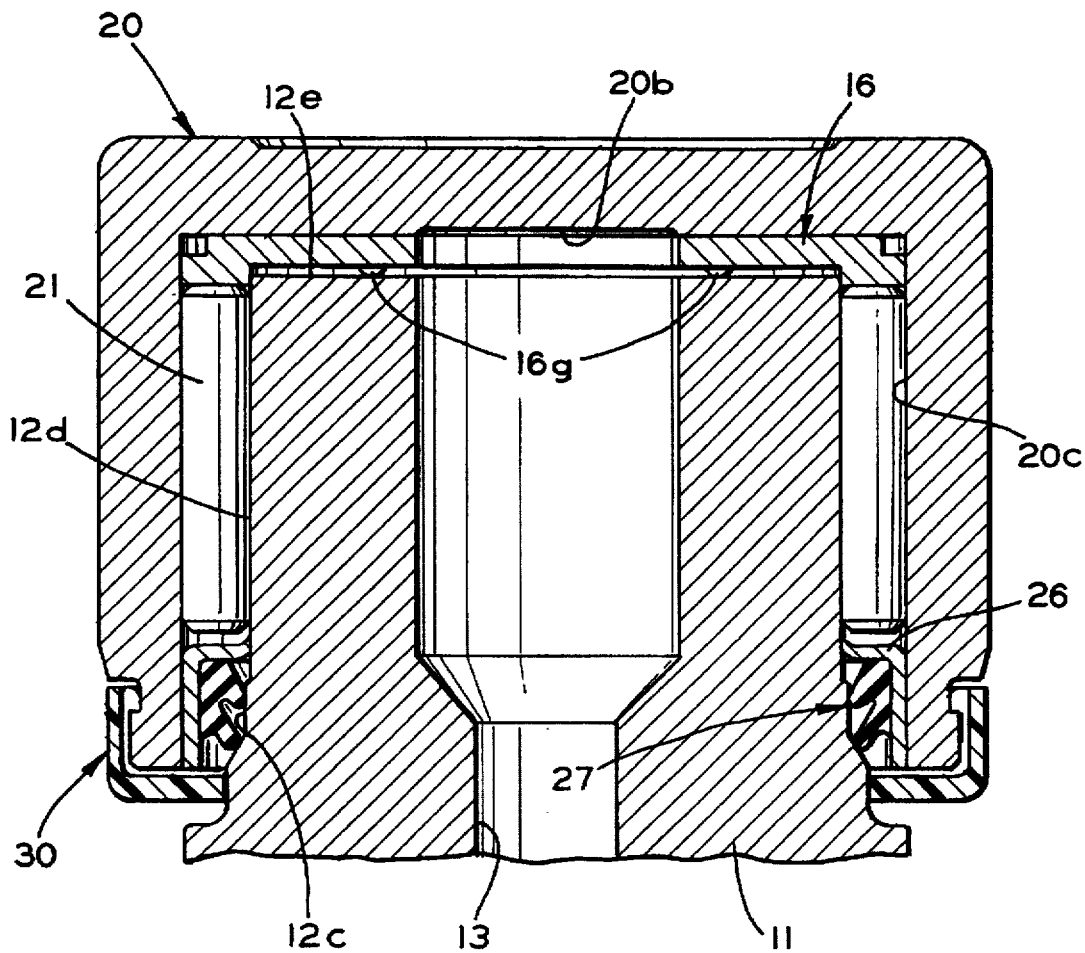
FIG. 7 is a sectional elevational view similar to FIG. 2 which illustrates a second embodiment of the thrust washer of this invention.
Figure 8:
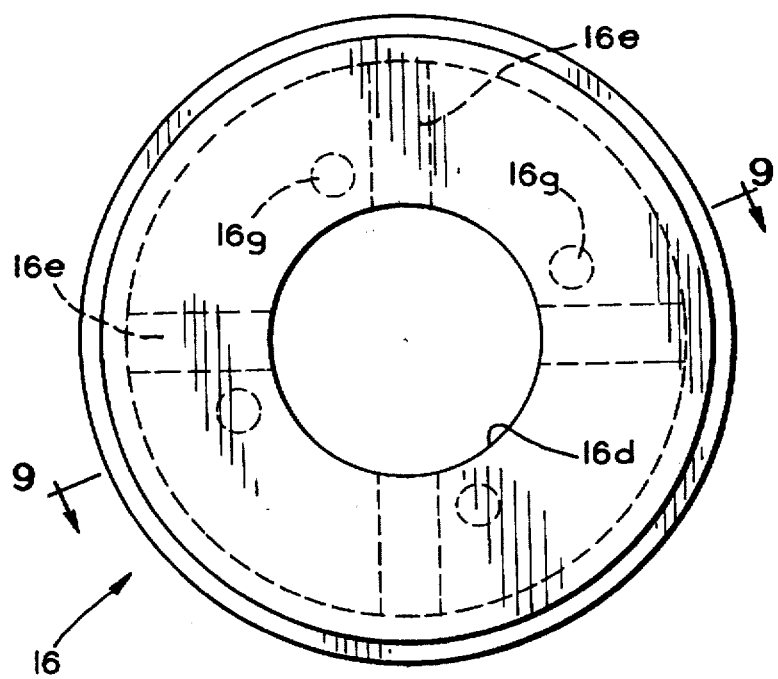
FIG. 8 is a plan view of the thrust washer shown in FIG. 7.
Figure 9:
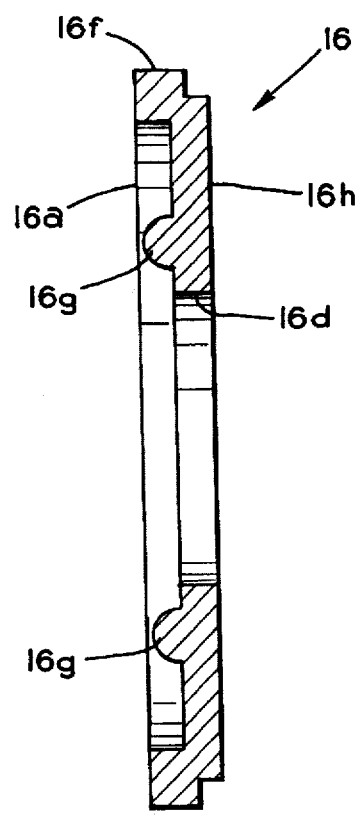
FIG. 9 is a sectional elevational view of the thrust washer taken along line 9—9 of FIG. 8.

A second embodiment of a thrust washer 16 in accordance with this invention is shown in FIGS. 7 through 9. In this second embodiment, the inner surface 16a of the thrust washer 16 includes a plurality of protuberances 16g located adjacent the center aperture 16d. Similarly to the first embodiment, these protuberances 16g provide a small preloading force at a limited contact area on the outer end 12e of each trunnion 12. In this second embodiment, the protuberances 16g are functionally equivalent to the tapered inner surface 16a described previously and therefore, define the thrust surface 16b.

In general, a plurality of protuberances 16g may be positioned adjacent the center aperture 16d. The protuberances 16g may be hemispherical in shape. Alternatively, any other type of shape could be used. In addition, the protuberances 16g may be located equidistantly from one another or positioned randomly with respect to each other.

In a preferred embodiment, four protuberances 16g are spaced equidistantly from each other, or about 90° apart from one another. As a result, the thrust surface 16b in this embodiment is located in a generally annular shaped zone. Similarly to the first embodiment, the height of the protuberances 16g (i.e. the thrust surface 16b) is dependent on a number of factors. These factors include the requirement to providing a sufficient preloading force which sufficiently reduces radial play between the trunnions 12, bearing cups 20 and the yokes while minimizing the flex effort required to allow the cross member 10 to pivot about its axes. Other factors include the stackup of manufacturing tolerances and the overall total thickness of the thrust washer 16.

As an example, for a thrust washer having an overall thickness of about 0.065 inches to about 0.070 inches, the protuberances 16g may be about 0.006 inches in height. In general, the height of the protuberances may range from about 1% to about 10% of the total thickness of the thrust washer 16.

In addition, the diameter of the protuberances 16g may be increased or decreased to change the mount of preloading force which is applied by the thrust washer 16. As an example, for a thrust washer 16 having an overall radius of about 0.917 inches to about 0.922 inches, the diameter of the protuberances 16g is about 0.02 inches. Similarly to the first embodiment, the protuberances 16g are made from a deformable material which is subject to wear. This ensures that the protuberances 16g will deform and/or wear away after the very short initial balancing and break-in period of the universal joint.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A thrust washer adapted to provide a pre-loading force between a bearing cup rotatably mounted on a trunnion of a universal joint cross member comprising:

an annular disk defining an inner surface, an outer surface, and an outer circumferential surface, said annular disk having an aperture formed therethrough defining an inner circumferential surface, a portion of said inner surface being tapered from adjacent said inner circumferential surface toward said outer circumferential surface such that a thickness of said annular disk defined between said portion of said inner surface and said outer surface is at a maximum adjacent said inner circumferential surface.

2. The thrust washer defined in claim 1 wherein said portion of said inner surface is tapered from said inner circumferential surface toward said outer circumferential surface such that said thickness of said annular disk deemed between said portion of said inner surface and said outer surface is at a maximum at said inner circumferential surface.

3. The thrust washer defined in claim 1 wherein said annular disk is formed from one of plastic, robber, nylon, stanyl, nylatron, and a glass filled nylon composite.

4. The thrust washer defined in claim 1 wherein said thickness of said annular disk adjacent said outer circumferential surface is in the range of from about 1% to about 10% of said thickness of said annular disk adjacent said inner circumferential surface.

5. The thrust washer defined in claim 5 wherein a groove is formed in inner surface of said annular disk.

6. The thrust washer defined in claim 5 wherein said groove extends radially from said inner circumferential surface toward said outer circumferential surface.

7. The thrust washer deemed in claim 1 wherein a plurality of grooves is formed in inner surface of said annular disk.

8. The thrust washer deemed in claim 7 wherein each of said grooves extends radially from said inner circumferential surface toward said outer circumferential surface.

9. The thrust washer defined in claim 1 wherein said annular disk has a flange formed on said inner surface adjacent to said outer circumferential surface.

10. A The thrust washer defined in claim 1 wherein said portion of said inner surface is tapered linearly.

11. A universal joint cross member comprising:
a body portion having a trunnion extending outwardly therefrom;
a bearing cup rotatably mounted on said trunnion; and
a thrust washer disposed between said bearing cup and said trunnion for providing a pre-loading force, said thrust washer including an annular disk defining an inner surface, an outer surface, and an outer circumferential surface, said annular disk having an aperture formed therethrough defining an inner circumferential surface, a portion of said inner surface being tapered from adjacent said inner circumferential surface toward said outer circumferential surface such that a thickness of said annular disk defined between said portion of said inner surface and said outer surface is at a maximum adjacent said inner circumferential surface.

12. The universal joint cross member defined in claim 11 wherein said portion of said inner surface is tapered from said inner circumferential surface toward said outer circumferential surface such that said thickness of said annular disk defined between said portion of said inner surface and said outer surface is at a maximum at said inner circumferential surface.

13. The universal joint cross member defined in claim 11 wherein said annular disk is formed from one of plastic, rubber, nylon, stanyl, nylatron, and a glass filled nylon composite.

14. The universal joint cross member defined in claim 11 wherein said thickness of said annular disk adjacent said outer circumferential surface is in the range of from about 1% to about 10% of said thickness of said annular disk adjacent said inner circumferential surface.

15. The universal joint cross member defined in claim 11 wherein a groove is formed in inner surface of said annular disk.

16. The universal joint cross member defined in claim 15 wherein said groove extends radially from said inner circumferential surface toward said outer circumferential surface.

17. The universal joint cross member defined in claim 11 wherein a plurality of grooves is formed in inner surface of said annular disk.

18. The universal joint cross member defined in claim 11 wherein each of said grooves extends radially from said inner circumferential surface toward said outer circumferential surface.

19. The universal joint cross member defined in claim 11 wherein said annular disk has a flange formed on said inner surface adjacent to said outer circumferential surface.

20. The universal joint cross member defined in claim 11 wherein said portion of said inner surface is tapered linearly.

* * * * *